June 30, 1970   P. L. RUBEN   3,517,985
SIX ELEMENT PETZVAL-TYPE PROJECTION LENS
Filed Jan. 23, 1968

PAUL L. RUBEN
INVENTOR.

BY William F. Delaney
Robert W Hampton
ATTORNEYS

United States Patent Office 3,517,985
Patented June 30, 1970

3,517,985
SIX ELEMENT PETZVAL-TYPE PROJECTION LENS
Paul L. Ruben, Penfield, N.Y., assignor to Eastman Kodak Company, Rochester, N.Y., a corporation of New Jersey
Filed Jan. 23, 1968, Ser. No. 699,836
Int. Cl. G02b 9/62, 9/34
U.S. Cl. 350—215                                8 Claims

ABSTRACT OF THE DISCLOSURE

A modified Petzval lens is disclosed comprising two widely separated airspaced doublets, a biconvex element located between the doublets, and a field flattening negative element behind the rearmost doublet.

BACKGROUND OF THE INVENTION

This invention relates to projection lenses and particularly to highly corrected modifications of the well-known Petzval-type lens.

Petzval-type lenses usually comprise two widely separated doublets, which are either cemented or slightly airspaced. They cover a relatively narrow angular field and are usually not particularly well corrected for astigmatism or curvature of field. However, they give good resolution at high aperture. Because of the curvature of the field, a field flattener is usually added to such systems immediately in front of the focal plane. It is also quite common to include a positive element between the two doublets for increased apertures. Such modified systems, in which the doublets are airspaced, have been found to produce satisfactory resolution for projection purposes at apertures as large as $f/1.0$. An example of such a lens is disclosed in U.S. Pat. No. 3,320,016 in which a $f/1.0$ modified Petzval lens is disclosed having astigmatism of less than 4% of the focal length.

SUMMARY OF THE INVENTION

The object of the present invention is to provide improved lenses of the modified Petzval type operating at $f/1.0$ which are particularly well corrected for field curvature, as well as for spherical, comatic, chromatic and astigmatic aberrations and for distortion.

According to the present invention, modified Petzval lenses of the type described above are provided, in which the negative element in the rear doublet is exceptionally thick to reduce curvature of field together with the conventional field flattening element, and in which the airspaces between the elements of each doublet are greater than in the prior art lenses. The positive element between the doublets is biconvex and located exceptionally close to the rearmost doublet to reduce spherical aberration. Glasses having high refractive indexes are used in all elements except the positive element located between the doublets. These high refractive indexes permit the selection of surface curvatures to reduce spherical aberration at high apertures.

The above described features are provided according to the invention in improved modified Petzval lenses comprising two airspaced doublets, a biconvex positive element between the doublets and a negative field flattening element behind the rearmost doublet, wherein the parameters of the lens elements are substantially within the following ranges of values, in which the lens elements are numbered from the front (i.e. the long conjugate side). $N_D$ is the index of refraction of each lens element for the D line of the spectrum, V is the index of dispersion, and R, T and S refer respectively to the radii of curvature of the lens surfaces, the thicknesses of the lens elements and the airspaces between the elements, numbered by subscript from front to rear:

Equivalent Focal Length=100 mm.      $f/1.0$

| Lens | $N_D$ | V | Radii (mm.) | Thicknesses and Spacings (mm.) |
|---|---|---|---|---|
| I | 1.611 to 1.713 | 53.8 to 58.8 | $R_1$=96.13 to 114.3<br>$R_2$=−762.5 to −1126 | $T_1$=22.7 to 28.6<br>$S_1$=11.5 to 19.7 |
| II | 1.672 to 1.728 | 28.3 to 32.2 | $R_3$=−137.1 to −154.8<br>$R_4$=232 to 1612 | $T_2$=11.4 to 22.2<br>$S_2$=41.5 to 63.2 |
| III | 1.516 to 1.517 | 64.0 to 64.5 | $R_5$=51.24 to 66.13<br>$R_6$=−196.0 to −325.1 | $T_3$=25.4 to 33.7<br>$S_3$=1.79 to 2.33 |
| IV | 1.611 to 1.713 | 53.8 to 58.8 | $R_7$=61.42 to 74.10<br>$R_8$=+1816 to −2845 | $T_4$=8.82 to 13.0<br>$S_4$=1.08 to 2.22 |
| V | 1.717 to 1.755 | 27.5 to 29.5 | $R_9$=−145.4 to −189.6<br>$R_{10}$=192.6 to 340.5 | $T_5$=22.5 to 33.4<br>$S_5$=3.14 to 5.05 |
| VI | 1.717 to 1.755 | 27.5 to 29.5 | $R_{11}$=−50.70 to −71.00<br>$R_{12}$>234.0 | $T_6$=2.50 to 3.64 |

Most of the above ranges do not separately distinguish over the prior art, since the invention is in the combination of parameters which define modifications of a well-known type of lens. The important characteristics of the invention are the values or airspaces $S_1$, $S_3$ and $S_4$, and the thickness $T_5$ of element V. The separations $S_1$ and $S_4$ between the two doublets are larger than in prior art lenses of this type, $S_1$ being greater than .1F and $S_4$ being greater than .01F. Element III is located very close to the rear doublet, such that $S_3$ is less than .025F which is smaller than the corresponding airspace in prior art lenses. Lens Element V is thicker than .2F as compared with .15F or smaller corresponding thicknesses disclosed in the prior art.

BRIEF DESCRIPTION OF THE DRAWINGS

Preferred embodimeants of the invention are disclosed below with reference to the drawings.

DESCRIPTION OF THE PREFERRED EMBODIMENT

Figure 1:
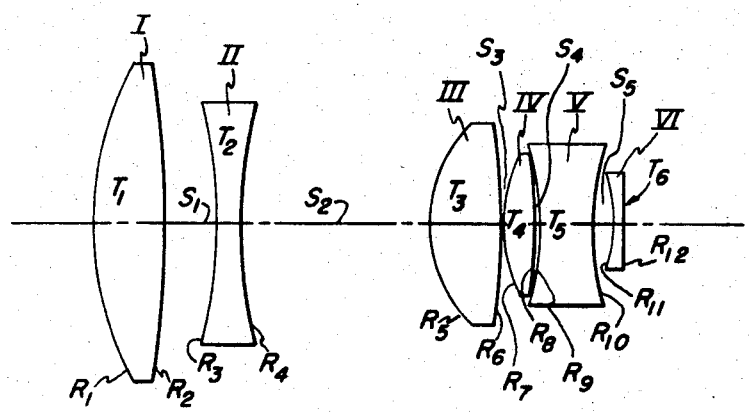
FIG. 1 illustrates a lengs system incorporating a preferred embodiment of the invention.

The lens in FIG. 1 comprises six simple airspaced elements including from the front or long conjugate side of the lens, a first airspaced positive doublet I and II, a simple biconvex element III, a second positive airspaced doublet IV and V, and a negative field flattening element VI located behind the second doublet near the focal plane of the lens. Elements I, III and IV are biconvex, and elements II and V are both biconcave. The field flattening element VI is concave-plano. Although element IV in this embodiment is biconvex, it can be positive meniscus element, as in Example VI below. In addition, element VI can be biconcave, as in Example VII.

Numerical data for constructing typical projection lenses according to the invention as outlined above is given in the following seven examples:

EXAMPLE 1
Equivalent Focal Length=100 mm.    $f/1.0$

| Lens | $N_D$ | V | Radii (mm.) | Thicknesses and Spacings (mm.) |
|---|---|---|---|---|
| I | 1.713 | 53.9 | $R_1=107.3$ | $T_1=27.6$ |
|   |       |      | $R_2=-870.3$ | $S_1=17.1$ |
| II | 1.728 | 28.3 | $R_3=-154.3$ | $T_2=11.4$ |
|    |       |      | $R_4=232.0$ | $S_2=56.8$ |
| III | 1.516 | 64.0 | $R_5=51.24$ | $T_3=30.0$ |
|     |       |      | $R_6=-325.1$ | $S_3=2.27$ |
| IV | 1.713 | 53.9 | $R_7=63.48$ | $T_4=10.7$ |
|    |       |      | $R_8=-2845$ | $S_4=1.99$ |
| V | 1.755 | 27.5 | $R_9=-151.9$ | $T_5=22.5$ |
|   |       |      | $R_{10}=321.0$ | $S_5=4.95$ |
| VI | 1.755 | 27.5 | $R_{11}=-50.70$ | $T_6=3.18$ |
|    |       |      | $R_{12}=$Plano |  |

EXAMPLE 2
Equivalent Focal Length=100 mm.    $f/1.0$

| Lens | $N_D$ | V | Radii (mm.) | Thicknesses and Spacings (mm.) |
|---|---|---|---|---|
| I | 1.713 | 53.8 | $R_1=112.0$ | $T_1=26.3$ |
|   |       |      | $R_2=-776.1$ | $S_1=19.1$ |
| II | 1.728 | 28.4 | $R_3=-153.3$ | $T_2=22.2$ |
|    |       |      | $R_4=265.4$ | $S_2=47.5$ |
| III | 1.517 | 64.2 | $R_5=51.55$ | $T_3=33.7$ |
|     |       |      | $R_6=-247.9$ | $S_3=1.79$ |
| IV | 1.713 | 53.8 | $R_7=63.22$ | $T_4=8.82$ |
|    |       |      | $R_8=-2313$ | $S_4=1.96$ |
| V | 1.755 | 27.6 | $R_9=-145.4$ | $T_5=24.2$ |
|   |       |      | $R_{10}=291.2$ | $S_5=3.68$ |
| VI | 1.755 | 27.6 | $R_{11}=-53.03$ | $T_6=3.54$ |
|    |       |      | $R_{12}=$Plano |  |

Figure 2A:
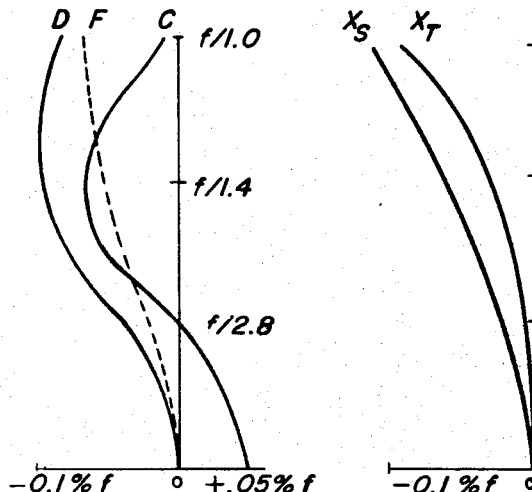
FIG. 2 comprises a set of correction curves for the lens disclosed in Example 1 below showing (A) the spherical aberration curves for the C, D and F lines of the spectrum, (B) the curves for sagittal and tangential astigmatism, and (C) the curve for distortion.
Figure 2B:
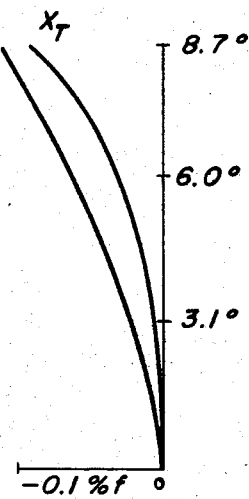
Figure 2C:
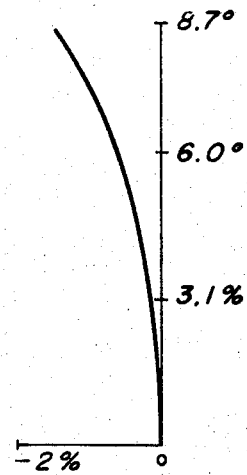
Figure 3A:
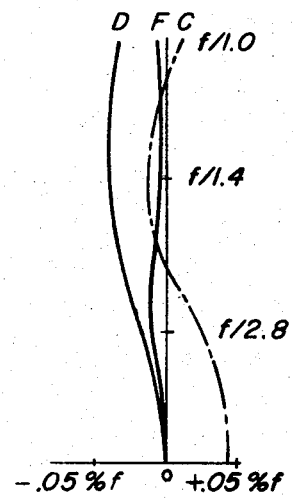
FIG. 3 comprises a similar set of correction curves for the lens disclosed in Example 2 below.
Figure 3B:
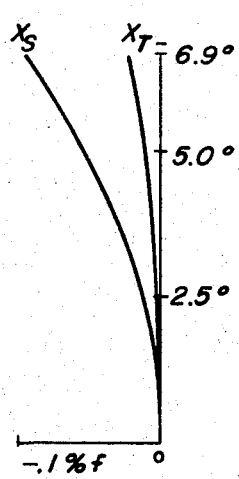
Figure 3C:
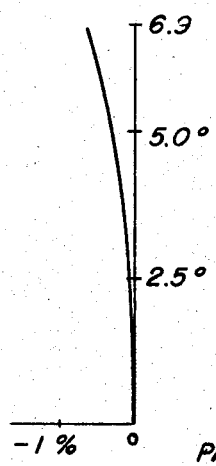

As shown by the curves in FIGS. 2 and 3, the lenses described above in Examples 1 and 2, respectively, are corrected to such a degree that spherical abberation for the D line of the spectrum is less than 0.1 percent of the focal length, the sagittal and tangential fields vary less than 0.15 percent of the focal length and distortion is less than 2 percent.

EXAMPLE 3
Equivalent Focal Length=100 mm.    $f/1.0$

| Lens | $N_D$ | V | Radii (mm.) | Thicknesses and spacings (mm.) |
|---|---|---|---|---|
| I | 1.613 | 58.6 | $R_1=96.13$ | $T_1=26.3$ |
|   |       |      | $R_2=-988.5$ | $S_1=13.0$ |
| II | 1.672 | 32.2 | $R_3=-137.1$ | $T_2=11.4$ |
|    |       |      | $R_4=390.6$ | $S_2=41.5$ |
| III | 1.516 | 64.0 | $R_5=66.13$ | $T_3=26.4$ |
|     |       |      | $R_6=-196.0$ | $S_3=2.27$ |
| IV | 1.613 | 58.6 | $R_7=73.38$ | $T_4=13.0$ |
|    |       |      | $R_8=-281.4$ | $S_4=1.35$ |
| V | 1.717 | 29.5 | $R_9=-149.6$ | $T_5=33.4$ |
|   |       |      | $R_{10}=278.0$ | $S_5=4.95$ |
| VI | 1.717 | 29.5 | $R_{11}=-52.49$ | $T_6=3.18$ |
|    |       |      | $R_{12}=$Plano |  |

EXAMPLE 4
Equivalent Focal Length=100 mm.    $f/1.0$

| Lens | $N_D$ | V | Radii (mm.) | Thicknesses and spacings (mm.) |
|---|---|---|---|---|
| I | 1.611 | 58.8 | $R_1=97.88$ | $T_1=27.4$ |
|   |       |      | $R_2=-885.6$ | $S_1=11.5$ |
| II | 1.672 | 32.0 | $R_3=-141.4$ | $T_2=12.7$ |
|    |       |      | $R_4=472.4$ | $S_2=44.3$ |
| III | 1.517 | 64.5 | $R_5=64.24$ | $T_3=25.9$ |
|     |       |      | $R_6=-215.2$ | $S_3=2.27$ |
| IV | 1.611 | 58.8 | $R_7=74.10$ | $T_4=12.8$ |
|    |       |      | $R_8=-277.5$ | $S_4=1.23$ |
| V | 1.720 | 29.3 | $R_9=-153.7$ | $T_5=31.9$ |
|   |       |      | $R_{10}=246.9$ | $S_5=5.05$ |
| VI | 1.720 | 29.3 | $R_{11}=-52.07$ | $T_6=3.18$ |
|    |       |      | $R_{12}=$Plano |  |

EXAMPLE 5
Equivalent Focal Length=100 mm.    $f/1.0$

| Lens | $N_D$ | V | Radii (mm.) | Thicknesses and spacings (mm.) |
|---|---|---|---|---|
| I | 1.697 | 56.2 | $R_1=105.6$ | $T_1=28.6$ |
|   |       |      | $R_2=-112.6$ | $S_1=17.0$ |
| II | 1.720 | 29.3 | $R_3=-154.8$ | $T_2=11.4$ |
|    |       |      | $R_4=250.0$ | $S_2=52.2$ |
| III | 1.517 | 64.5 | $R_5=54.18$ | $T_3=30.8$ |
|     |       |      | $R_6=-317.3$ | $S_3=2.27$ |
| IV | 1.697 | 56.2 | $R_7=64.14$ | $T_4=10.9$ |
|    |       |      | $R_8=-1560$ | $S_4=2.22$ |
| V | 1.751 | 27.8 | $R_9=-155.6$ | $T_5=24.1$ |
|   |       |      | $R_{10}=340.5$ | $S_5=4.75$ |
| VI | 1.751 | 27.8 | $R_{11}=-54.93$ | $T_6=3.18$ |
|    |       |      | $R_{12}=$Plano |  |

EXAMPLE 6

Equivalent Focal Length=100 mm.    f/1.0

| Lens | $N_D$ | V | Radii (mm.) | Thicknesses and spacings (mm.) |
|---|---|---|---|---|
| I | 1.697 | 56.2 | $R_1$=114.3 | $T_1$=25.7 |
|   |       |      | $R_2$=−762.5 | $S_1$=19.7 |
| II | 1.720 | 29.3 | $R_3$=−151.6 | $T_2$=19.6 |
|    |       |      | $R_4$=291.2 | $S_2$=52.2 |
| III | 1.517 | 64.5 | $R_5$=52.45 | $T_3$=33.5 |
|     |       |      | $R_6$=−234.2 | $S_3$=2.04 |
| IV | 1.697 | 56.2 | $R_7$=61.42 | $T_4$=8.94 |
|    |       |      | $R_8$=1816.3 | $S_4$=2.07 |
| V | 1.751 | 27.8 | $R_9$=−149.4 | $T_5$=25.8 |
|   |       |      | $R_{10}$=258.5 | $S_5$=4.19 |
| VI | 1.751 | 27.8 | $R_{11}$=−53.85 | $T_6$=2.50 |
|    |       |      | $R_{12}$=Plano |  |

EXAMPLE 7

Equivalent Focal Length=100 mm.    f/1.0

| Lens | $N_D$ | V | Radii (mm.) | Thicknesses and spacings (mm.) |
|---|---|---|---|---|
| I | 1.611 | 58.8 | $R_1$=109.6 | $T_1$=22.7 |
|   |       |      | $R_2$=−828.8 | $S_1$=19.6 |
| II | 1.720 | 29.3 | $R_3$=−147.1 | $T_2$=11.4 |
|    |       |      | $R_4$=1612 | $S_2$=63.2 |
| III | 1.517 | 64.5 | $R_5$=60.19 | $T_3$=25.4 |
|     |       |      | $R_6$=−252.9 | $S_3$=2.33 |
| IV | 1.697 | 56.2 | $R_7$=70.71 | $T_4$=12.9 |
|    |       |      | $R_8$=−442.9 | $S_4$=1.08 |
| V | 1.751 | 27.8 | $R_9$=−189.6 | $T_5$=26.6 |
|   |       |      | $R_{10}$=192.6 | $S_5$=3.14 |
| VI | 1.751 | 27.8 | $R_{11}$=−71.00 | $T_6$=3.64 |
|    |       |      | $R_{12}$=234.0 |  |

The invention has been described in detail with particular reference to preferred embodiments thereof, but it will be understood that variations and modifications can be effected within the spirit and scope of the invention as described hereinabove and as defined in the appended claims.

I claim:

1. A lens having an equivalent focal length of 100 mm. comprising six airspaced elements having substantially the following characteristics in which the lens elements are numbered from the front, $N_D$ is the index of refraction for the D line of the spectrum, V is the index of dispersion, and R, T and S refer respectively to the radii of curvature of the lens surfaces, the axial thicknesses of the lens elements and the axial spacings between the lens elements, numbered by subscript from front to rear:

| Lens | $N_D$ | V | Radii (mm.) | Thicknesses and Spacings (mm pp) |
|---|---|---|---|---|
| I | 1.713 | 53.9 | $R_1$=107.3 | $T_1$=27.6 |
|   |       |      | $R_2$=−870.3 | $S_1$=17.1 |
| II | 1.728 | 28.3 | $R_3$=−154.3 | $T_2$=11.4 |
|    |       |      | $R_4$=232.0 | $S_2$=56.8 |
| III | 1.516 | 64.0 | $R_5$=51.24 | $T_3$=30.0 |
|     |       |      | $R_6$=−325.1 | $S_3$=2.27 |
| IV | 1.713 | 53.9 | $R_7$=63.48 | $T_4$=10.7 |
|    |       |      | $R_8$=−2845 | $S_4$=1.99 |
| V | 1.755 | 27.5 | $R_9$=−151.9 | $T_5$=22.5 |
|   |       |      | $R_{10}$=321.0 | $S_5$=4.95 |
| VI | 1.755 | 27.5 | $R_{11}$=−50.70 | $T_6$=3.18 |
|    |       |      | $R_{12}$=Plano |  |

2. A lens having an equivalent focal length of 100 mm. comprising six airspaced elements having substantially the following characteristics in which the lens elements are numbered from the front, $N_D$ is the index of refraction for the D line of the spectrum, V is the index of dispersion, and R, T and S refer respectively to the radii of curvature of the lens surfaces, the axial thicknesses of the lens elements and the axial spacings between the lens elements, numbered by subscript from front to rear:

| Lens | $N_D$ | V | Radii (mm.) | Thicknesses and Spacings (mm.) |
|---|---|---|---|---|
| I | 1.713 | 53.8 | $R_1$=112.0 | $T_1$=26.3 |
|   |       |      | $R_2$=−776.1 | $S_1$=19.1 |
| II | 1.728 | 28.4 | $R_3$=−265.4 | $T_2$=22.2 |
|    |       |      | $R_4$=265.4 | $S_2$=47.5 |
| III | 1.517 | 64.2 | $R_5$=51.55 | $T_3$=33.7 |
|     |       |      | $R_6$=−247.9 | $S_3$=1.79 |
| IV | 1.713 | 53.8 | $R_7$=63.22 | $T_4$=8.82 |
|    |       |      | $R_8$=−2313 | $S_4$=1.96 |
| V | 1.755 | 27.6 | $R_9$=−145.4 | $T_5$=24.2 |
|   |       |      | $R_{10}$=291.2 | $S_5$=3.68 |
| VI | 1.755 | 27.6 | $R_{11}$=−53.03 | $T_6$=3.54 |
|    |       |      | $R_{12}$=Plano |  |

3. A lens having an equivalent focal length of 100 mm. comprising six airspaced elements having substantially the following characteristics in which the lens elements are numbered from the front, $N_D$ is the index of refraction for the D line of the spectrum, V is the index of dispersion, and R, T and S refer respectively to the radii of curvature of the lens surfaces, the axial thicknesses of the lens elements and the axial spacings between the lens elements, numbered by subscript from front to rear:

| Lens | $N_D$ | V | Radii (mm.) | Thicknesses and spacings (mm.) |
|---|---|---|---|---|
| I | 1.613 | 58.6 | $R_1=96.13$ | $T_1=26.3$ |
|   |       |      | $R_2=-988.5$ | $S_1=13.0$ |
| II | 1.672 | 32.2 | $R_3=-137.1$ | $T_2=11.4$ |
|    |       |      | $R_4=390.6$ | $S_2=41.5$ |
| III | 1.516 | 64.0 | $R_5=66.13$ | $T_3=26.4$ |
|     |       |      | $R_6=-196.0$ | $S_3=2.27$ |
| IV | 1.613 | 58.6 | $R_7=73.38$ | $T_4=13.0$ |
|    |       |      | $R_8=-281.4$ | $S_4=1.35$ |
| V | 1.717 | 29.5 | $R_9=-149.6$ | $T_5=33.4$ |
|   |       |      | $R_{10}=278.0$ | $S_5=4.95$ |
| VI | 1.717 | 29.5 | $R_{11}=-52.49$ | $T_6=3.18$ |
|    |       |      | $R_{12}=$Plano | |

4. A lens having an equivalent focal length of 100 mm. comprising six airspaced elements having substantially the following characteristics in which the lens elements are numbered from the front, $N_D$ is the index of refraction for the D line of the spectrum, V is the index of dispersion, and R, T and S refer respectively to the radii of curvature of the lens surfaces, the axial thicknesses of the lens elements and the axial spacings between the lens elements, numbered by subscript from front to rear:

| Lens | $N_D$ | V | Radii (mm.) | Thicknesses and spacings (mm.) |
|---|---|---|---|---|
| I | 1.611 | 58.8 | $R_1=97.88$ | $T_1=27.4$ |
|   |       |      | $R_2=-885.6$ | $S_1=11.5$ |
| II | 1.672 | 32.0 | $R_3=-141.4$ | $T_2=12.7$ |
|    |       |      | $R_4=472.4$ | $S_2=44.3$ |
| III | 1.517 | 64.5 | $R_5=64.24$ | $T_3=25.9$ |
|     |       |      | $R_6=-215.2$ | $S_3=2.27$ |
| IV | 1.611 | 58.8 | $R_7=74.10$ | $T_4=12.8$ |
|    |       |      | $R_8=-277.5$ | $S_4=1.23$ |
| V | 1.720 | 29.3 | $R_9=-153.7$ | $T_5=31.9$ |
|   |       |      | $R_{10}=246.9$ | $S_5=5.05$ |
| VI | 1.720 | 29.3 | $R_{11}=-52.07$ | $T_6=3.18$ |
|    |       |      | $R_{12}=$Plano | |

5. A lens having an equivalent focal length of 100 mm. comprising six airspaced elements having substantially the following characteristics in which the lens elements are numbered from the front, $N_D$ is the index of refraction for the D line of the spectrum, V is the index of dispersion, and R, T and S refer respectively to the radii of curvature of the lens surfaces, the axial thicknesses of the lens elements and the axial spacings between the lens elements, numbered by subscript from front to rear:

| Lens | $N_D$ | V | Radii (mm.) | Thicknesses and spacings (mm.) |
|---|---|---|---|---|
| I | 1.697 | 56.2 | $R_1=105.6$ | $T_1=28.6$ |
|   |       |      | $R_2=-1126$ | $S_1=17.0$ |
| II | 1.720 | 29.3 | $R_3=-154.8$ | $T_2=11.4$ |
|    |       |      | $R_4=250.0$ | $S_2=52.2$ |
| III | 1.517 | 64.5 | $R_5=54.18$ | $T_3=30.8$ |
|     |       |      | $R_6=-317.3$ | $S_3=2.27$ |
| IV | 1.697 | 56.2 | $R_7=64.14$ | $T_4=10.9$ |
|    |       |      | $R_8=-1560$ | $S_4=2.22$ |
| V | 1.751 | 27.8 | $R_9=-155.6$ | $T_5=24.1$ |
|   |       |      | $R_{10}=340.5$ | $S_5=4.75$ |
| VI | 1.751 | 27.8 | $R_{11}=-54.93$ | $T_6=3.18$ |
|    |       |      | $R_{12}=$Plano | |

6. A lens having an equivalent focal length of 100 mm. comprising six airspaced elements having substantially the following characteristics in which the lens elements are numbered from the front, $N_D$ is the index of refraction for the D line of the spectrum, V is the index of dispersion, and R, T and S refer respectively to the radii of curvature of the lens surfaces, the axial thicknesses of the lens elements and the axial spacings between the lens elements, numbered by subscript from front to rear:

| Lens | $N_D$ | V | Radii (mm.) | Thicknesses and spacings (mm.) |
|---|---|---|---|---|
| I | 1.697 | 56.2 | $R_1=114.3$ | $T_1=25.7$ |
|   |       |      | $R_2=-762.5$ | $S_1=19.7$ |
| II | 1.720 | 29.3 | $R_3=-151.6$ | $T_2=19.6$ |
|    |       |      | $R_4=291.2$ | $S_2=52.2$ |
| III | 1.517 | 64.5 | $R_5=52.45$ | $T_3=33.5$ |
|     |       |      | $R_6=-234.2$ | $S_3=2.04$ |
| IV | 1.697 | 56.2 | $R_7=61.42$ | $T_4=8.94$ |
|    |       |      | $R_8=1816.3$ | $S_4=2.07$ |
| V | 1.751 | 27.8 | $R_9=-149.4$ | $T_5=25.8$ |
|   |       |      | $R_{10}=258.5$ | $S_5=4.19$ |
| VI | 1.751 | 27.8 | $R_{11}=-53.85$ | $T_6=2.50$ |
|    |       |      | $R_{12}=$Plano | |

7. A lens having an equivalent focal length of 100 mm. comprising six airspaced elements having substantially the following characteristics in which the lens elements are numbered from the front, $N_D$ is the index of refraction for the D line of the spectrum, V is the index of dispersion, and R, T and S refer respectively to the radii of curvature of the lens surfaces, the axial thicknesses of the lens elements and the axial spacings between the lens elements, numbered by subscript from front to rear:

| Lens | $N_D$ | V | Radii (mm.) | Thicknesses and Spacings (mm.) |
|---|---|---|---|---|
| I | 1.611 | 58.8 | $R_1=109.6$ $R_2=-828.8$ | $T_1=22.7$ $S_1=19.6$ |
| II | 1.720 | 29.3 | $R_3=-147.1$ $R_4=1612$ | $T_2=11.4$ $S_2=63.2$ |
| III | 1.517 | 64.5 | $R_5=60.19$ $R_6=-252.9$ | $T_3=25.4$ $S_3=2.33$ |
| IV | 1.697 | 56.2 | $R_7=70.71$ $R_8=-442.9$ | $T_4=12.9$ $S_4=1.08$ |
| V | 1.751 | 27.8 | $R_9=-189.6$ $R_{10}=192.6$ | $T_5=26.6$ $S_5=3.14$ |
| VI | 1.751 | 27.8 | $R_{11}=-71.00$ $R_{12}=234.0$ | $T_6=3.64$ |

8. A six element Petzval type lens having an equivalent focal length of 100 mm. comprising from front to rear, a first airspaced doublet consisting of a front biconvex element and a rear biconcave element, a simple biconvex element, a second positive airspaced doublet consisting of a front positive element and a rear biconcave element, and a negative field flattening element behind the second doublet, the elements having characteristics substantially within the following ranges of values in which the lens elements are numbered from the front, $N_D$ is the index of refraction for the D line of the spectrum, V is the index of dispersion and R, T and S refer respectively to the radii of curvature of the lens surfaces, the axial thicknesses of the lens elements and the axial spacings between the lens elements, numbered by subscript from front to rear:

| Lens | $N_D$ | V | Radii (mm.) | Thicknesses and Spacings (mm.) |
|---|---|---|---|---|
| I | 1.611 to 1.713 | 53.8 to 58.8 | $R_1=96.13$ to $114.3$ $R_2=-762.5$ to $-1126$ | $T_1=22.7$ to $28.6$ $S_1=11.5$ to $19.7$ |
| II | 1.672 to 1.728 | 28.3 to 32.2 | $R_3=-137.1$ to $-154.8$ $R_4=232$ to $1612$ | $T_2=11.4$ to $22.2$ $S_2=41.5$ to $63.2$ |
| III | 1.516 to 1.517 | 64.0 to 64.5 | $R_5=51.24$ to $66.13$ $R_6=-196.0$ to $-325.1$ | $T_3=25.4$ to $33.7$ $S_3=1.79$ to $2.33$ |
| IV | 1.611 to 1.713 | 53.8 to 58.8 | $R_7=61.42$ to $74.10$ $R_8=+1816$ to $-2845$ | $T_4=8.82$ to $13.0$ $S_4=1.08$ to $2.22$ |
| V | 1.717 to 1.755 | 27.5 to 29.5 | $R_9=-145.4$ to $-189.6$ $R_{10}=192.6$ to $340.5$ | $T_5=22.5$ to $33.4$ $S_5=3.14$ to $5.05$ |
| VI | 1.717 to 1.755 | 27.5 to 29.5 | $R_{11}=-50.70$ to $-71.00$ $R_{12}>234.0$ | $T_6=2.50$ to $3.64$ |

References Cited
UNITED STATES PATENTS 2,685,229 8/1954 Schultz et al. _____ 350—214
3,320,016 5/1967 Van Graafeiland _____ 350—215

FOREIGN PATENTS 536,448 5/1941 Great Britain.

DAVID SCHONBERG, Primary Examiner

P. A. SACHER, Assistant Examiner

U.S. Cl. X.R.

350—224